US010611072B2

(12) United States Patent
Lacaze et al.

(10) Patent No.: US 10,611,072 B2
(45) Date of Patent: Apr. 7, 2020

(54) HANDHELD 3D PRINTER

(71) Applicant: Robotic Research, LLC, Gaithersburg, MD (US)

(72) Inventors: Alberto Daniel Lacaze, Potomac, MD (US); Karl Nicholas Murphy, Rockville, MD (US)

(*) Notice: Subject to any disclaimer, the term of this patent is extended or adjusted under 35 U.S.C. 154(b) by 0 days.

(21) Appl. No.: 16/568,726

(22) Filed: Oct. 17, 2019

(65) Prior Publication Data
US 2020/0070394 A1    Mar. 5, 2020

Related U.S. Application Data

(62) Division of application No. 15/411,976, filed on Jan. 21, 2017, now Pat. No. 10,569,459.

(51) Int. Cl.
*B33Y 30/00* (2015.01)
*B29C 48/02* (2019.01)
*B29C 48/155* (2019.01)

(52) U.S. Cl.
CPC ............ *B29C 48/02* (2019.02); *B29C 48/155* (2019.02)

(58) Field of Classification Search
CPC ............................ B29C 48/02; B29C 48/155
See application file for complete search history.

(56) References Cited

U.S. PATENT DOCUMENTS

| 2014/0127400 | A1* | 5/2014 | Zanon | C23C 26/00 |
| | | | | 427/140 |
| 2017/0203509 | A1* | 7/2017 | Stieghorst | A61N 1/0541 |
| 2017/0298580 | A1* | 10/2017 | Flitsch | B29C 64/106 |
| 2018/0326644 | A1* | 11/2018 | Shen | B29C 48/92 |

* cited by examiner

*Primary Examiner* — Nahida Sultana
(74) *Attorney, Agent, or Firm* — Radha Narayanan

(57) ABSTRACT

A device is described where an operator uses a handheld nozzle that deposits new material onto a part. The process can be used to create new parts from a substrate, or to repair parts. The device automatically maps the physical part and matches the physical part against a model of the desired part. As the operator moves the nozzle over the part, the device automatically computes the amount of material necessary to modify the current part to match the model of the desired part. This method can be used for spraying or spray-casting metal, ceramics, and other materials. The described process and device automates this process, and simplifies the operator's involvement. Moreover, because the device can measure the part as the material is being deposited, the resulting part is more likely to more closely resemble the original part both in aesthetics and physical properties.

3 Claims, 2 Drawing Sheets

201

HANDHELD 3D PRINTER

CROSS REFERENCE TO RELATED APPLICATIONS

This application claims priority from U.S. Patent Application Ser. No. 62/326,711, entitled "Handheld 3D Printer", filed on 23 Apr. 2016. The benefit under 35 USC § 119(e) of the United States provisional application is hereby claimed, and the aforementioned application is hereby incorporated herein by reference.

This application which is a divisional application also claims priority from U.S. patent application Ser. No. 15/411,976, entitled "Handheld 3D Printer", filed on 21 Jan. 2017. The benefit under 35 USC § 119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE PRESENT INVENTION

The present invention relates generally to 3D printing solutions. More specifically, the present invention relates to deployed, handheld, 3D printable solutions.

BACKGROUND OF THE PRESENT INVENTION

Cold spray is an advanced surface repair process that is revolutionizing many industries. The process is most important when repairs need to be performed in situ. Cold spray uses gas to accelerate metal powders usually in the 5um to 100 um to supersonic speeds. As the accelerated particles hit the substrate material, they plastically deform and deposit onto the substrate to create bonds.

Many materials can be deposited this way (Aluminum, Titanium, etc). Manufacturers have developed portable devices that can be used for these purposes. They are composed of a nozzle that a trained user points to the area where deposition is desired. The process is similar to painting or coating a surface, with the main difference being that significant buildup can be applied to repair the surface. Currently, the user sprays in the locations where he/she perceives that the repair is needed. Often, a trigger-like mechanism is used in the nozzle to control the amount of particles being ejected.

General Electric (GE) researchers have developed an additive technology called "Cold Spray," in which metal powders are sprayed, at high velocities, to build a part or add material to repair an existing part. Cold spray is part of GE's expanded additive manufacturing toolkit.

The technology was invented in Russia in the mid-80s, and today cold spray is mostly used for repair. The biggest application in the US is for the US army to repair helicopter parts that are made out of magnesium alloys. But most of the work being done today is soft, low temperature alloys, like copper, aluminum, and zinc. For GE, the challenge was to use this technology to produce high quality deposits made of high temperature Ni and Ti alloys. The Cold Spray technology GE has developed can be used for additive manufacturing to build 3D shapes, or repair existing metal construction without damaging or investing heavily in the core material.

Definitions

Direct metal sintering (DMLS).
Selective laser sintering (SLS).
A fiducial marker or fiducial is an object placed in the field of view of an imaging device which appears in the image produced, for use as a point of reference or a measure. It may be either something placed into or on the imaging subject, or a mark, or set of marks in the reticle of an optical instrument.

SUMMARY OF THE PRESENT INVENTION

The present invention requires that the part being fixed or modified, and the nozzle from where the material is being ejected, are localized with respect to each other. There are several technologies that can accomplish this. In the present invention, visual fiducials are used. Fiducials are markers that are placed on the part that can be read from a sensor on the nozzle, or somewhere else in the surrounding. If the sensor is not placed on the nozzle, then another fiducial can be used on the nozzle to find the relative location between the part and the nozzle.

Since the presented invention adjusts the amount of deposited material to the desired level, it needs to be aware of the amount of material missing. A model is necessary to find this difference. In the general case, a CAD model of the part being repaired that includes (or is given) the location of the fiducial, can be used for this purpose. It is important to note that a complete model is not necessary.

A LADAR, stereo, or structured light sensor is used to measure the amount of material being deposited, as well as guide the operator in generating a model (if no a priori model of the part is available), or register the a priori model against the part being repaired. There are a variety of scanning devices accurate enough to create these models.

The operator then places a fiducial on the part. The operator (guided by the device) scans the part, including the area to be repaired. The scanned point cloud (or other model) of the part is displayed in the user interface. Using the scanned part, the operator selects the area to be repaired, either as a difference from an a priori model of the part, or by using a standard model (stencil) provided (plane, sphere, etc.). Once the operator assigns the tolerances desired for the material addition, the device is ready to start deposition. The operator will then point, with the nozzle, to the area to be repaired, and the device will automatically control the material flow to only add material where material is needed, and closing the nozzle in other areas.

The device is described where an operator uses a handheld nozzle that deposits new material onto a part. The process can be used to create new parts from a substrate, or to repair parts. The device automatically maps the physical part and matches the physical part against a model of the desired part. As the operator moves the nozzle over the part, the device automatically computes the amount of material necessary to modify the current part to match the model of the desired part. This method can be used for spraying or spray-casting metal, ceramics, and other materials.

Current methods for manual spray-casting of parts are being used to fix aeronautical parts. Operators have to guess how much material is missing from the part being repaired, by comparing their mental model against the perceived flaws of the physical part. The described process and device automates this process, and simplifies the operator's involvement. Moreover, because the presented device can measure the part as the material is being deposited, the resulting part is more likely to more closely resemble the original part (both in aesthetics and physical properties).

The present invention needs to compare the scanned model of the part against the desired model of the part and determine how much material to deposit. This algorithm may be a simple difference, or it can be significantly more complicated to include a finite element analysis of the flow of the material and/or substrate gas.

BRIEF DESCRIPTION OF THE DRAWINGS

The accompanying drawings, which are incorporated herein and form a part of the specification, illustrate the present invention and, together with the description, further serve to explain the principles of the present invention and to enable a person skilled in the pertinent art to make and use the present invention.

DETAILED DESCRIPTION OF THE PRESENT INVENTION

In the following detailed description of the present invention of exemplary embodiments of the present invention, reference is made to the accompanying drawings (where like numbers represent like elements), which form a part hereof, and in which is shown, by way of illustration, specific exemplary embodiments in which the present invention may be practiced. These embodiments are described in sufficient detail to enable those skilled in the art to practice the present invention, but other embodiments may be utilized and logical, mechanical, electrical, and other changes may be made without departing from the scope of the present invention. The following detailed description is, therefore, not to betaken in a limiting sense, and the scope of the present invention is defined only by the appended claims.

In the following description, numerous specific details are set forth to provide a thorough understanding of the present invention. However, it is understood that the present invention may be practiced without these specific details. In other instances, well-known structures and techniques, known to one of ordinary skill in the art, have not been shown in detail, in order not to obscure the present invention. Referring to the figures, it is possible to see the various major elements constituting the apparatus of the present invention.

Figure 1:
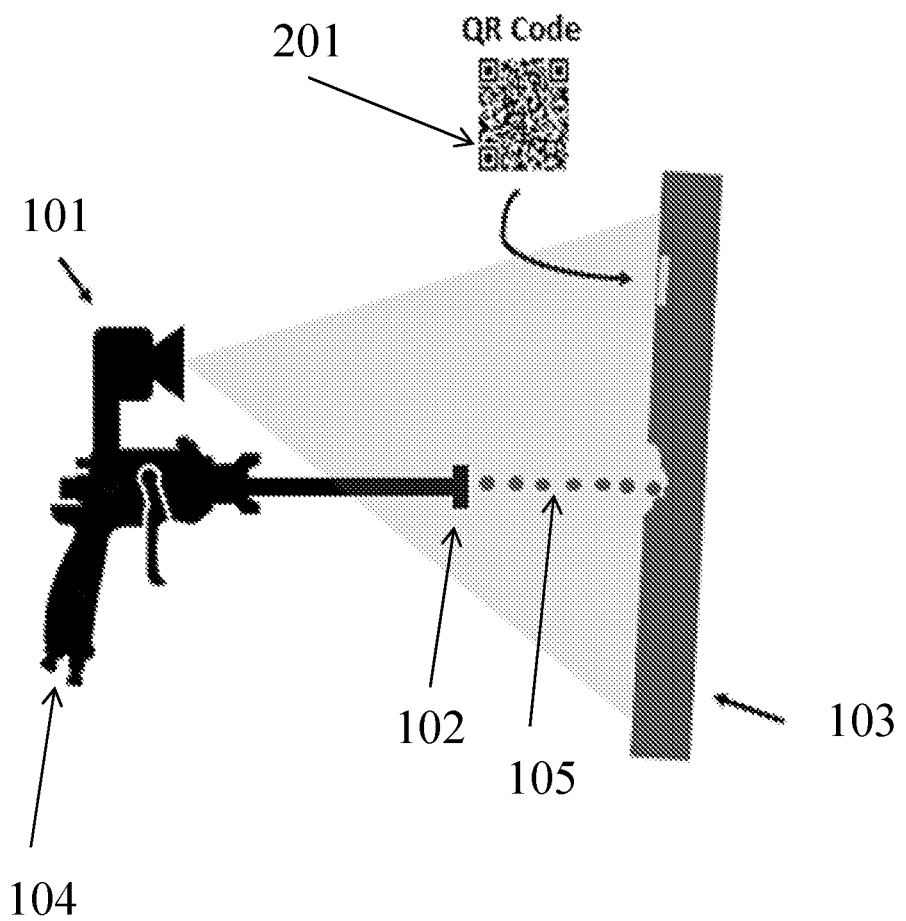
FIG. 1. Handheld Printer diagram.

The present invention automates the process of ad-hoc cold spray deposition. The device, a cold spray gun 104, is composed of a scanner 101, which is a positioning device that localizes the nozzle 102 with respect to the part 103. The device automatically detects, by comparing the real-time scan of the part to a model, the amount of missing material in the location in which the nozzle 102 is pointed, and automatically controls the amount of particles 105 (and other cold spray parameters) so as not to over deposit material in areas where it is not needed as shown in FIG. 1.

The present invention has a variety of advantages over the state of the art. Currently, the operator has to estimate the locations of where the material is missing. He/she has to mentally estimate the differences between the model of the part, and the current state of the part being repaired. Because it is impossible for the operator to accurately model these differences, they tend to overbuild areas causing waste, and under-build other areas causing the part to have to be re-sprayed after the milling process has already been started. By automating this process, the nozzle will automatically create the correct buildup in all areas of the part. Since the nozzle 102 has an integrated scanner 101, the measurement is compared in real-time to the model, as the depositing is performed.

Current operators mask some of the areas of the part so as not to spray them. Since the present invention controls the flow of the particles 105, areas can be automatically masked in software rather than having to physically protect other parts of the device saving both time and cost.

Cold spray can be a dangerous tool as the supersonic particles can easily penetrate skin and eyes. Protective equipment is used, but small holes in the equipment or accidental firing of the nozzle in the wrong direction can seriously harm the operator or bystanders. The presented device only fires the nozzle 102 if it is at a determined distance from the part 103. It is pointed at the part 103, and automatically positioned in an area where the part needs the material. The present invention will make the process of part repair significantly safer.

Cold spray repair is almost an art. The user currently air "sculpts" the part, adding material to the missing areas. This requires a significant amount of training. Cold spray technicians need to understand how the air flows around the part depending on the morphology of the surrounding areas. An untrained user will create ripples and unwanted edges to the part, which then need to be significantly milled away, thereby increasing the amount of wasted material, and more importantly, increasing milling/grinding time.

In many areas where repairs are needed, easy nozzle access is not warranted. On the contrary, because these repairs are usually performed in enclosed areas, maneuvering the nozzle 102 is not always easy. Therefore, the positioning of the tip may be off, decreasing accuracy as the operator maneuvers in the constrained environment. Because the present invention controls the flow of the material, accurate deposition thicknesses can be achieved even if the nozzle 102 trajectory is suboptimal.

Although the present embodiment utilizes a cold spray technique, there are a variety of other deposition methods currently being developed, or that have been in the industry for a number of years. For example, the same method can be used for hot spray or for laser deposition mechanisms. The material is not relegated to metals either. For example, the same device can be utilized with epoxy sprayers, or any other materials that lend themselves to deposition from a nozzle or gun.

The present invention requires that the part being fixed or modified, and the nozzle from where the material is being ejected, are localized with respect to each other. There are several technologies that can accomplish this. In the present invention, visual fiducials are used. Fiducials are markers that are placed on the part that can be read from a sensor on the nozzle, or somewhere else in the surrounding. If the sensor is not placed on the nozzle, then another fiducial can be used on the nozzle to find the relative location between the part and the nozzle.

Figure 2:
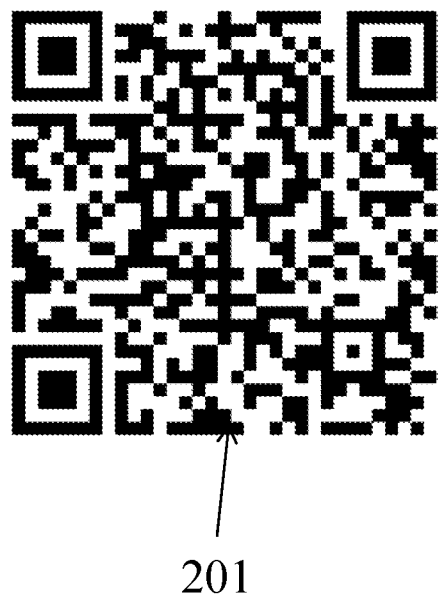
FIG. 2. A QR code is a type of fiducial that can be used for localization.

FIG. 2 shows an example of a fiducial. A QR code 201 can be used as a fiducial, as they are unique patterns that are specifically designed to contrast with the environment. A camera or scanner 101 on the nozzle 102 can view this QR code 201 or other fiducials and compute the relative location of the nozzle 102 with respect to the fiducial. Other fiducials, such as visual, IR, or even corner reflectors, can also be used.

Since the presented invention adjusts the amount of deposited material to the desired level, it needs to be aware of the amount of material missing. A model is necessary to find this difference. In the general case, a CAD model of the part being repaired that includes (or is given) the location of the fiducial, can be used for this purpose. It is important to note that a complete model is not necessary.

For example, let us say that the part in question has a pit on one of its flat surfaces. The operator can use a model of a "plane" and tell the device to only deposit in the areas that are pitted. The device will only turn on the nozzle when it senses that the nozzle is located over the pit, and fix the pit, bringing that area of the part to a plane. A set of simple 3D shapes that are commonly used can stored as part of the user interface as "stencils" by the operator.

A LADAR, stereo, or structured light sensor is used to measure the amount of material being deposited, as well as to guide the operator in generating a model (if no a priori model of the part is available), or to register the a priori model against the part being repaired. There are a variety of scanning devices accurate enough to create these models.

For example, hand held scanners are currently being used by dentists to create a model of a patient's mouth before creating an orthodontic device. The scanner does not need to be located on the nozzle, either, as long as it has full view of the area being repaired. For some scanners and parts, the scanner can be used as the positioning device without needing to use a fiducial.

The operator places a fiducial on the part. The operator (guided by the device) scans the part, including the area to be repaired. The scanned point cloud (or other model) of the part is displayed in the user interface. Using the scanned part, the operator selects the area to be repaired, either as a difference from an a priori model of the part, or by using a standard model (stencil) provided (plane, sphere, etc.). Once the operator assigns the tolerances desired for the material addition, the device is ready to start deposition. The operator will then point the nozzle to the area being repaired, and the device will automatically control the material flow, only adding material where material is needed, and closing the nozzle in other areas.

The present invention needs to compare the scanned model of the part against the desired model of the part and determine how much material to deposit. This algorithm may be a simple difference, or it can be significantly more complicated to include a finite element analysis of the flow of the material and/or substrate gas. In another embodiment, the model can be tabulated to include empirical deposition results or learned deposition results, given the rates observed over the part.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the present invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the present invention. Further, since numerous modifications and changes will readily occur to those skilled in the art, it is not desired to limit the present invention to the exact construction and operation shown and described, and accordingly, all suitable modifications and equivalents may be resorted to, falling within the scope of the present invention.

Thus, it is appreciated that the optimum dimensional relationships for the parts of the present invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method, and adjustments to the design are anticipated. Thus, the scope of the present invention should be determined by the appended claims and their legal equivalents, rather than by the examples given.

The invention claimed is:

1. A method for controlling the amount of material being ejected from a nozzle, to add material to areas where material is missing from a part, and stopping the material from ejecting where the material is not needed, comprising the steps of:
   providing a cold spray deposition device with nozzle that deposits material;
   providing a scanner to scan the part;
   measuring and determining the area where material is missing from a part and the area where material should be deposited on the part;
   finding the relative location of the nozzle with respect to the part being fixed by scanning the part and comparing the position of the part and the nozzle;
   localizing the nozzle with respect to the part;
   comparing the scan of the part to a model;
   determining the amount of missing material in the location in which the nozzle is pointed; and
   automatically controlling the amount of particles and cold spray parameters so as not to over deposit material in areas where it is not needed.

2. The method of claim 1, further comprising the step of
   scanning the model; and
   editing the part being modified.

3. The method of claim 1, further comprising the steps of:
   providing a software modeling tool on the cold spray deposition device,
   the modeling tool,
      considering the aerodynamic flow of the gas around the part;
      determining the amount of material being deposited; and
      controlling the gas around the material being deposited, in order to
   improve bonding and mechanical properties of the material being deposited.

* * * * *